(12) United States Patent
Chiu et al.

(10) Patent No.: US 6,353,432 B1
(45) Date of Patent: Mar. 5, 2002

(54) MOUSE SCROLL INPUT APPARATUS

(75) Inventors: Yer-Chen Chiu, Taipei Hsien; Kao-Pin Wu, Tainan; Wen-Fun Chu, Hsinchu, all of (TW)

(73) Assignee: Elan Microelectronics Corp., Hsinchu (TW)

( * ) Notice: Subject to any disclaimer, the term of this patent is extended or adjusted under 35 U.S.C. 154(b) by 0 days.

(21) Appl. No.: 09/222,722

(22) Filed: Dec. 29, 1998

(30) Foreign Application Priority Data

Dec. 31, 1997 (TW) .......................................... 86221756

(51) Int. Cl.[7] ................................................ G09G 5/08
(52) U.S. Cl. ...................... 345/163; 345/164; 345/165; 345/166; 345/167
(58) Field of Search ................................ 345/163, 164, 345/165, 166, 167

(56) References Cited

U.S. PATENT DOCUMENTS

| | | | | |
|---|---|---|---|---|
| 5,633,657 A | * | 5/1997 | Falcon | 345/145 |
| 5,635,956 A | * | 6/1997 | Tak | 345/163 |
| 5,850,212 A | * | 12/1998 | Nishibori | 345/160 |
| 5,963,197 A | * | 10/1999 | Bacon et al. | 345/163 |

* cited by examiner

*Primary Examiner*—Richard Hjerpe
*Assistant Examiner*—Jean Lesperance
(74) *Attorney, Agent, or Firm*—Thomas, Kayden, Horstemeyer & Risley

(57) ABSTRACT

The present invention discloses a mouse scroll input apparatus for controlling scrolling motions in a computer window, including a signal input device for generating an input signal in response to an operation of a mouse user, wherein a scrolling speed of the window is determined by a level of the input signal. According to the present invention, convenient operation can be achieved at low cost.

8 Claims, 13 Drawing Sheets

(a)

(b)

(a)

(b)

MOUSE SCROLL INPUT APPARATUS

FIELD OF THE INVENTION

The present invention relates to a mouse scroll input apparatus, and more particularly, to input equipment for controlling scrolling motions in a computer window.

BACKGROUND OF THE INVENTION

A conventional mouse can be moved on an X-Y plane and is provided with 2 or 3 buttons. FIG. 1 shows a typical example in which photo-couplers produce input signals representing motions in X direction (X1, X2) and Y direction (Y1, Y2), and then the input signals are converted to control signals.

In addition to the function mentioned above, an advanced mouse further provides single or double scrolls, so that a user can control scrolling motions in a window by using the mouse directly. FIG. 2 shows such a prior art apparatus in which scrolling motions in vertical and horizontal directions can be controlled by input signals representing vertical motion ($Z_{X1}$, $Z_{X2}$) and horizontal motion ($Z_{Y1}$, $Z_{Y2}$) produced by photo-couplers.

FIG. 3 shows an operational principle of the prior art apparatus in which a grating is carried by a roll to produce a phase difference in input signal. In FIG. 3(a), phase $Z_{X1}$ is ahead of $Z_{X2}$, which means scroll-up. On the contrary, in FIG. 3(b), phase $Z_{X2}$ is ahead of $Z_{X1}$, which means scroll-down. Further, the scrolling speed is proportional to the frequency of the waves.

The prior art apparatus mentioned above is high in cost and inconvenient in operation. To read a long article in a window, the roll has to be kept rolling. Besides, it is difficult to locate a specified paragraph.

FIG. 4 shows another conventional mouse in which four buttons are provided for controlling vertical motion ($Z_{X1}$, $Z_{X2}$) and horizontal motion ($Z_{Y1}$, $Z_{Y2}$). FIG. 5 shows an operational principle of the conventional mouse. In FIG. 5(a), button $Z_{X1}$ is pressed, which means upward motion. On the contrary, in FIG. 5(b), button $Z_{X2}$ is pressed, which means downward motion. Further, the scrolling speed is determined by the pressing time. The longer the button is pressed, the faster the scrolling speed is. However, it is inconvenient to control the scrolling speed by the pressing time.

In conclusion, according to the prior art, though scrolling motions can be directly controlled by a mouse, it is inconvenient and inefficient to operate the mouse. Therefore, it is desirable to overcome the prior arts problems mentioned above.

SUMMARY OF THE INVENTION

An object of the present invention is to provide a mouse scroll input apparatus having a better performance.

Another object of the present invention is to disclose a mouse scroll input apparatus which is easy to be operated.

A further object of the present invention is to provide a mouse scroll input apparatus which is low in cost.

In order to achieve the above objects, according to the present invention, a scroll speed is determined by a level of an input signal from a mouse scroll input apparatus.

In one aspect of the present invention, varistors are used as an input device for generating an input voltage signal having a level in response to an operation of a mouse user.

In another aspect of the present invention, photo-couplers are used as an input device for generating an input voltage signal having a level controlled by adjusting the transmission quantity of a grating in response to an operation of a mouse user.

These and other objects, features and advantages of the present invention will become apparent to those skilled in the art upon consideration of the following description of the preferred embodiments of the present invention taken in conjunction with the accompanying drawings

DETAILED DESCRIPTION

The following description will be made to the preferred embodiments of the present invention with reference to the accompanying drawings.

Figure 1:
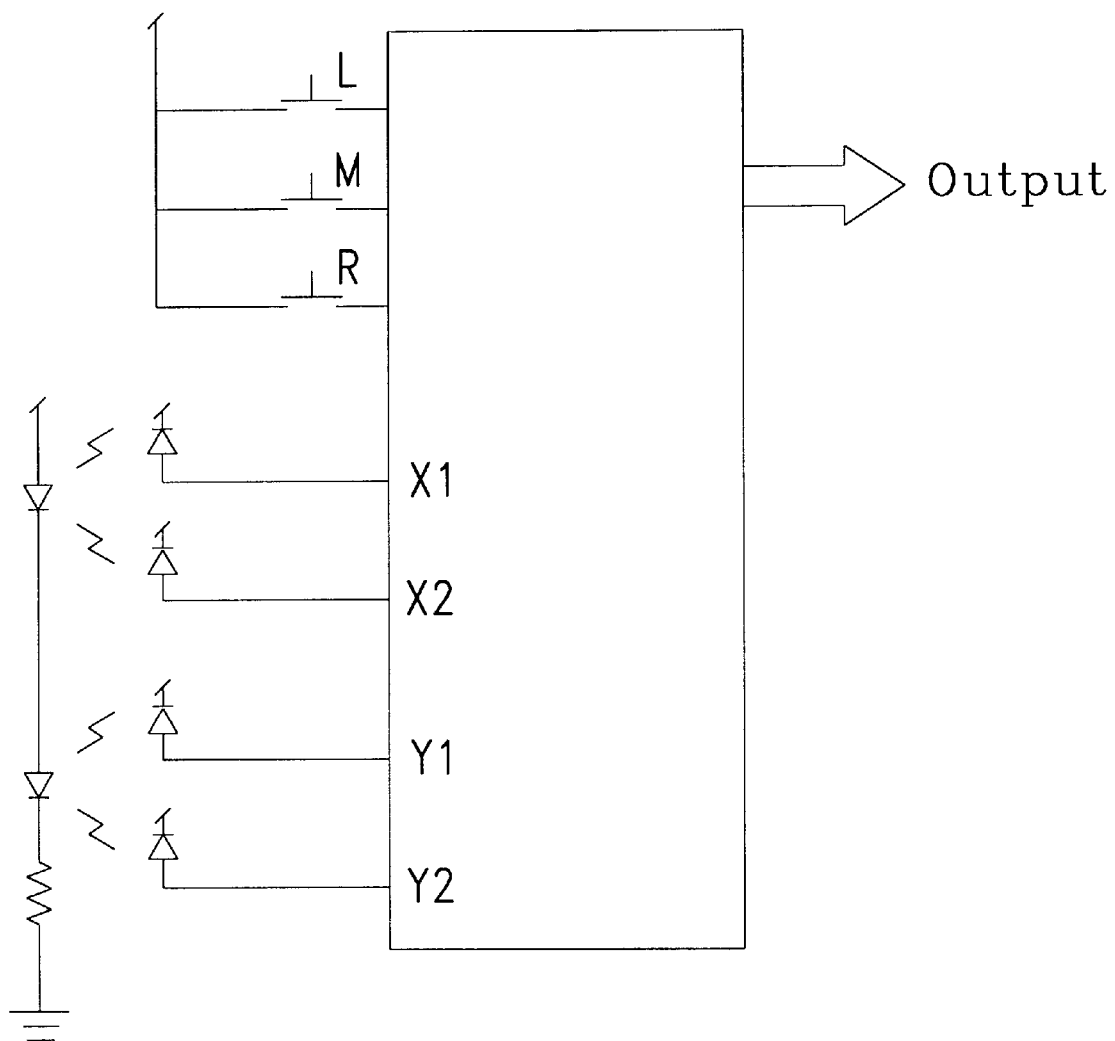
FIG. 1 shows a conventional mouse provided with vectors on X-Y plane and 3 buttons.
Figure 2:
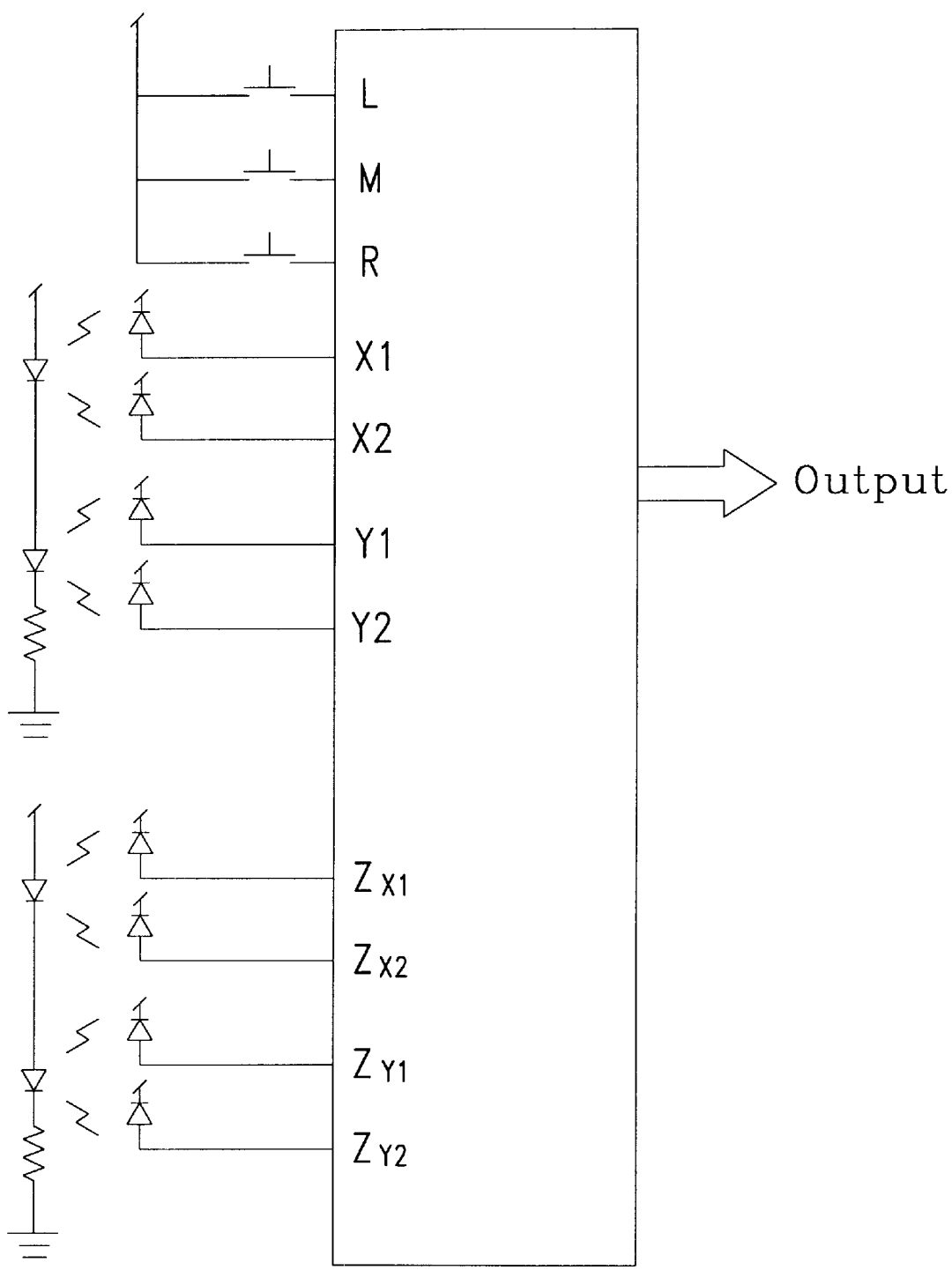
FIG. 2 is a schematic view showing prior art photo-couplers for mouse scrolling.
Figure 3:
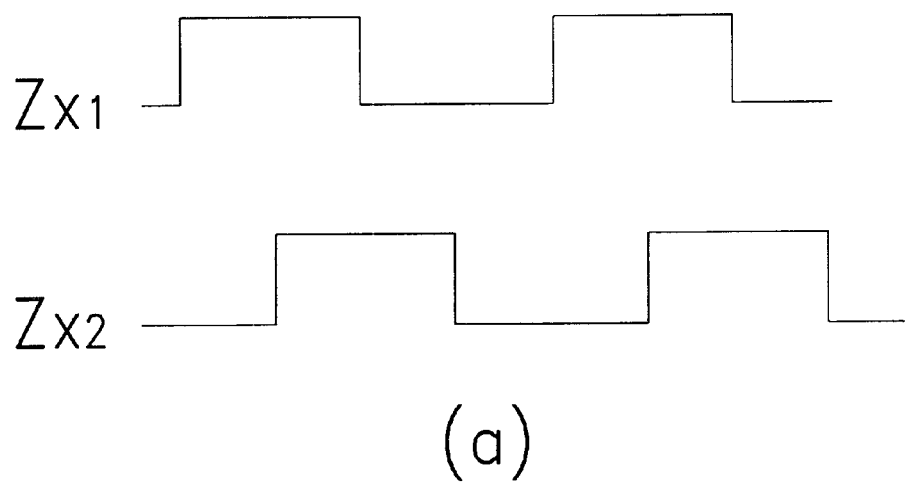
FIG. 3 shows an operational principle of the apparatus shown in FIG. 2.
Figure 3:
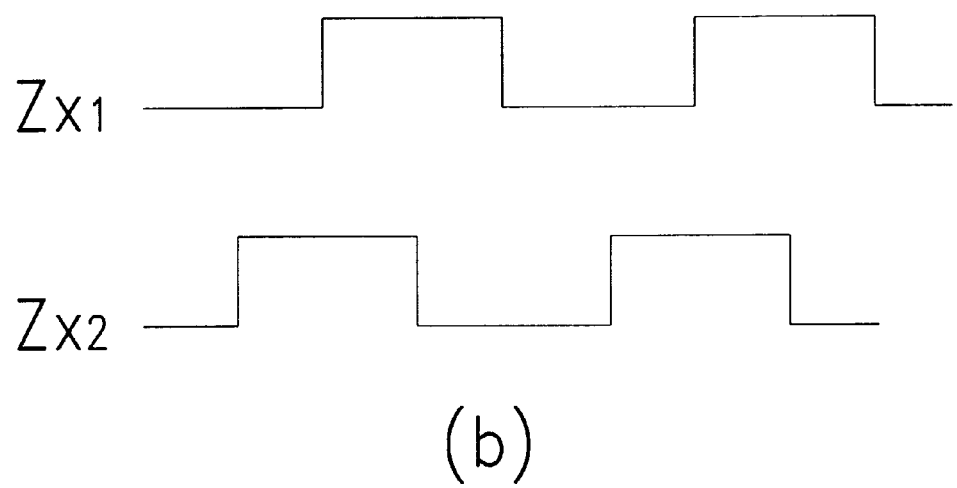
Figure 4:
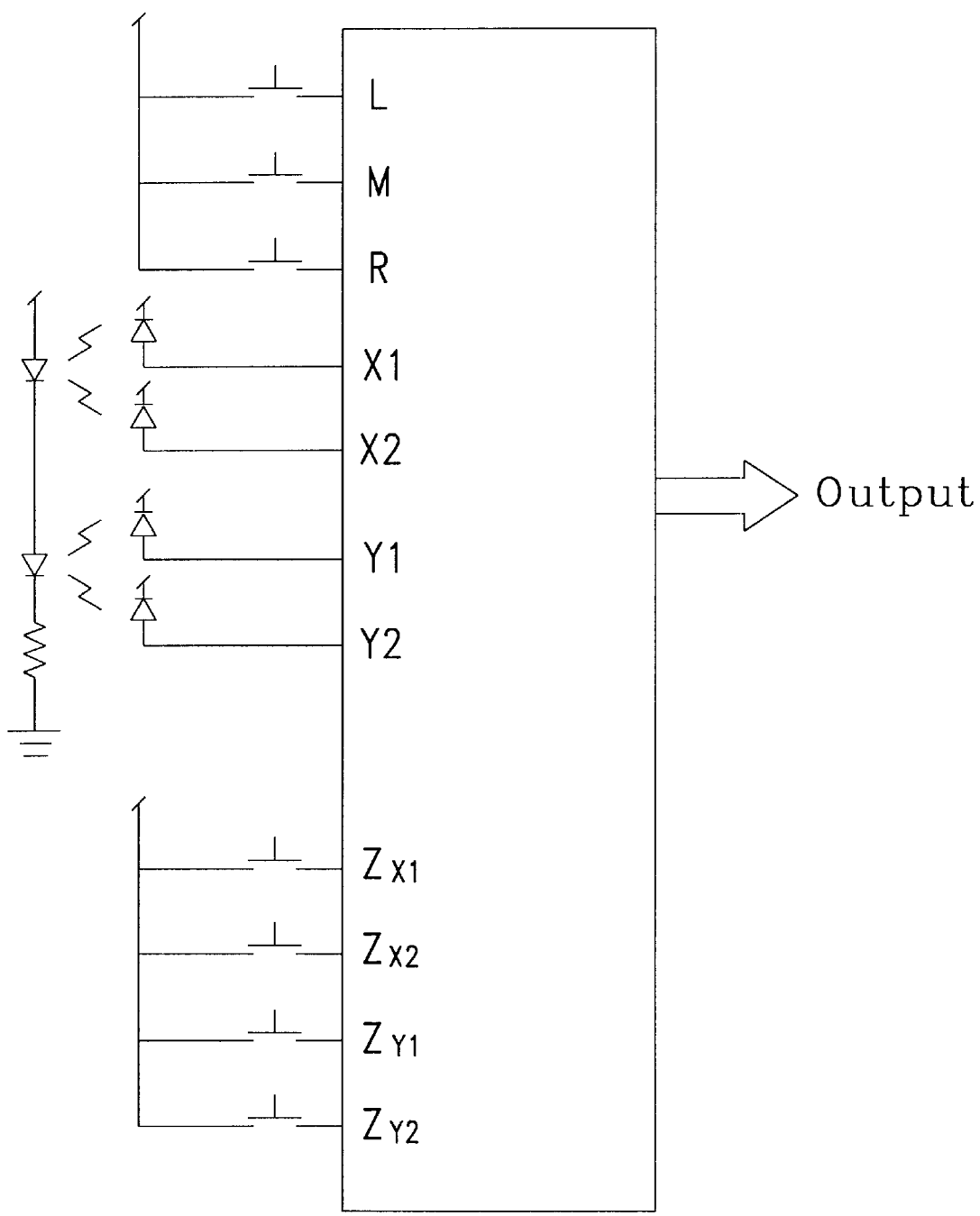
FIG. 4 is a schematic view showing prior art pushbuttons for mouse scrolling.
Figure 5:
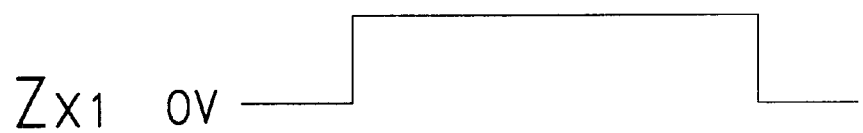
FIG. 5 shows an operational principle of the apparatus shown in FIG. 4.
Figure 5:
Figure 5:
Figure 5:
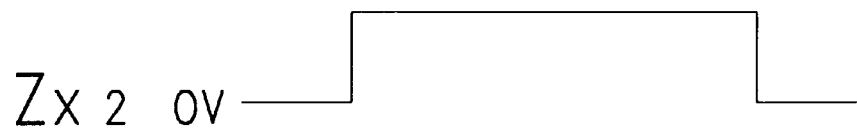
Figure 6:
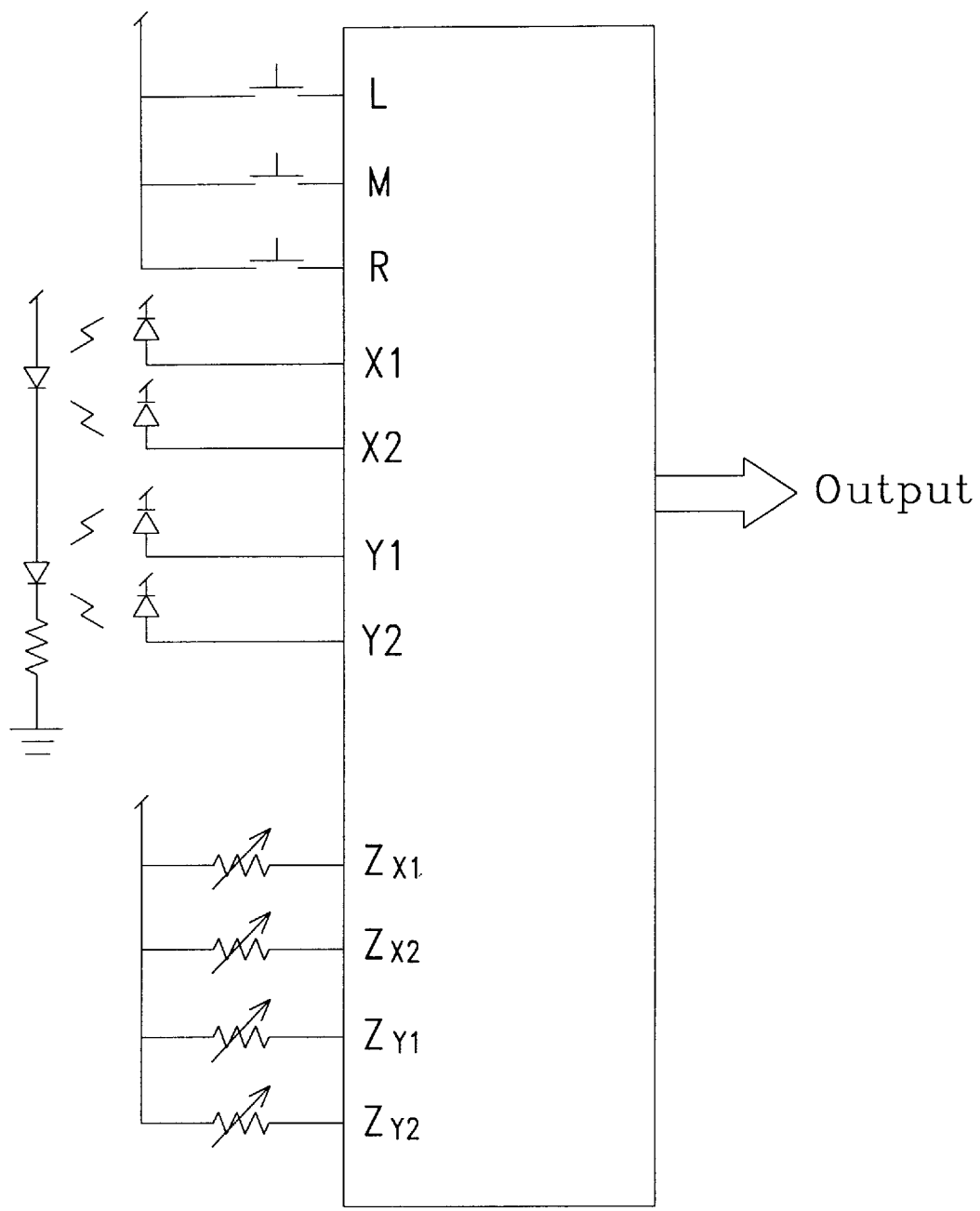
FIG. 6 shows a preferred embodiment of the present invention in which varistors are used as an input device.
Figure 7:
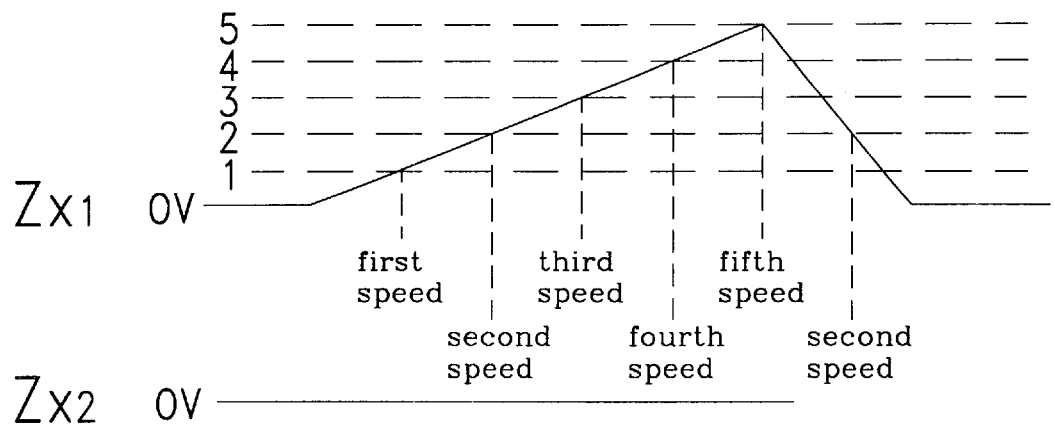
FIG. 7 shows an operational principle according to the present invention.
Figure 7:
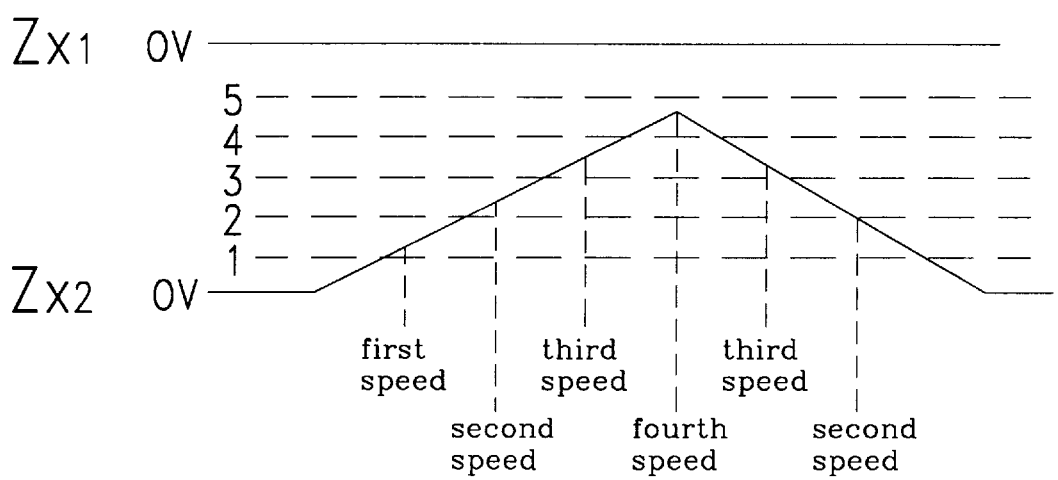

FIG. 6 shows a preferred embodiment of the present invention in which 4 varistors are used in a mouse scroll input apparatus to generate four input voltage signals of up ($Z_{X1}$), down ($Z_{X2}$), left ($Z_{Y1}$) and right ($Z_{Y2}$). The varistors can be adjusted to obtain input voltage signals of different levels. The operational principle of the present invention is shown in FIG. 7 in which the scrolling speed is determined by the level of the input signal. For example, as the resistance value of the varistor is smaller, the level of the input voltage signal is higher and the scrolling speed is higher. In FIG. 7(a), as $Z_{X1}$ level is higher, the upward scrolling speed is higher. Similarly, in FIG. 7(b), as $Z_{X2}$ level is higher, the downward scrolling speed is higher. The scrolling speed can be increased step-by-step or continuously with increase of the voltage level.

Figure 8:
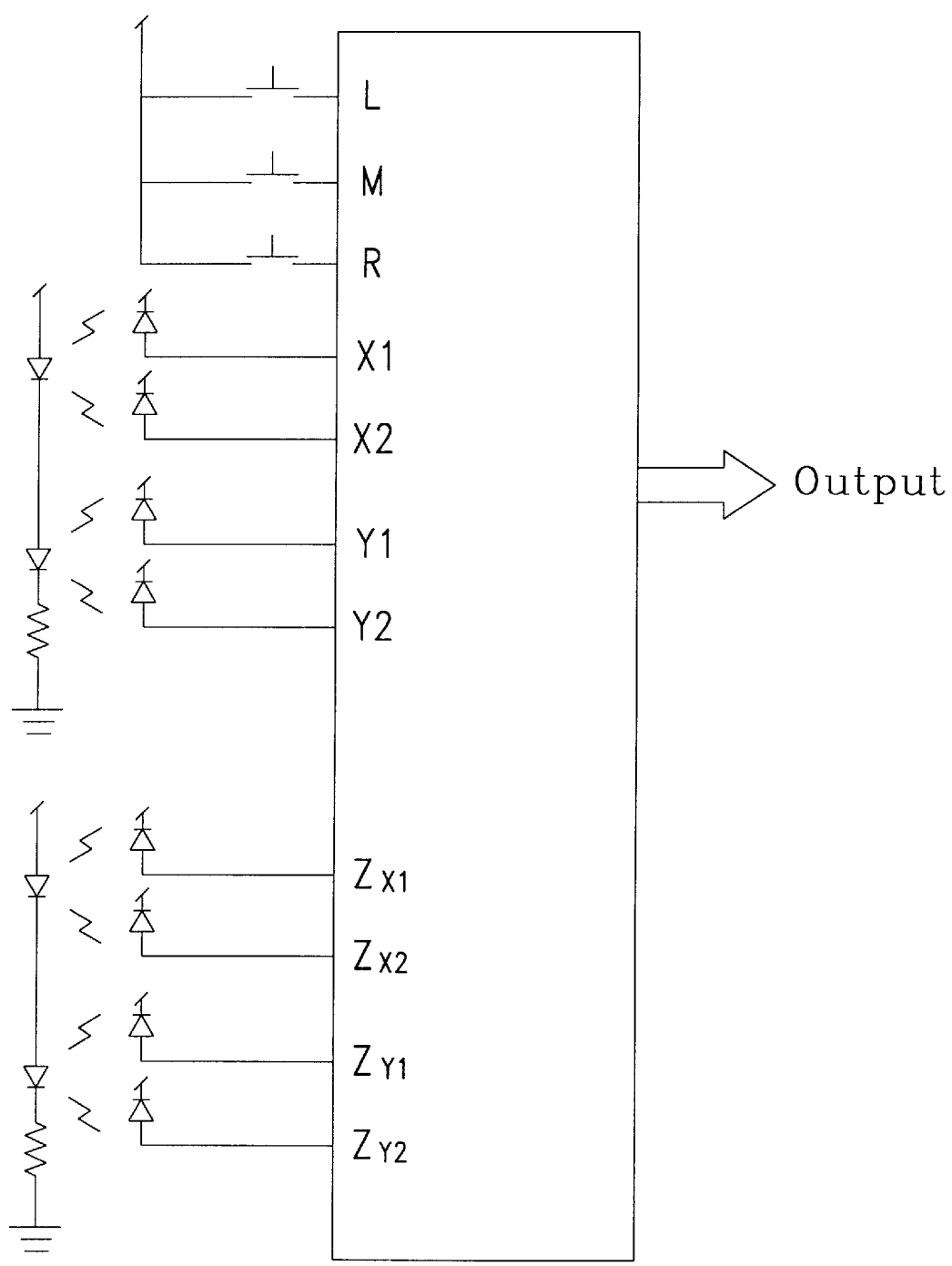
FIG. 8 shows another preferred embodiment of the present invention in which photo-couplers are used as an input device.

FIG. 8 shows another embodiment in which the scrolling speed is also determined by level of an input voltage signal but photo-couplers are used for input signal control instead. When a grating is closed, there is no scrolling motion. When the grating is opened wider, the transmission quantity thereof is larger and the voltage level of the input signal is higher so that the scrolling speed is faster.

Figure 9:
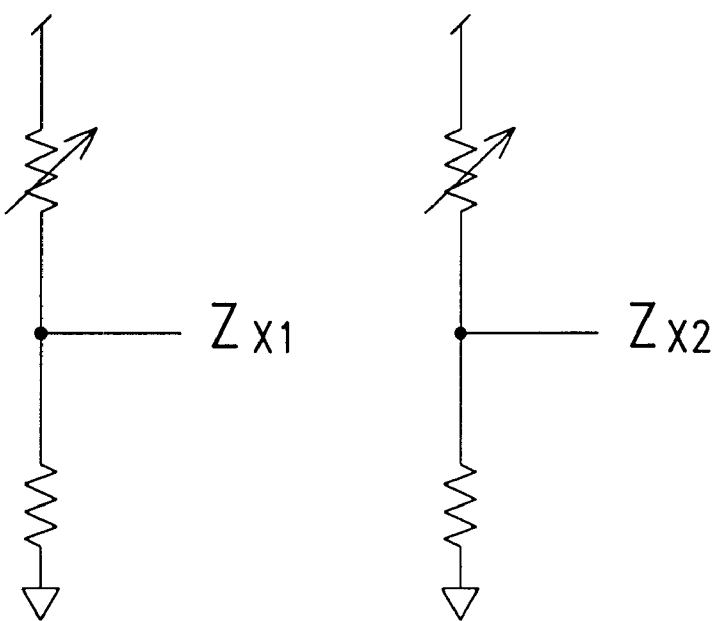
FIG. 9 is a schematic view corresponding to FIG. 6.

FIG. 9 shows the embodiment in which the input voltage signals are modulated by the varistors. As shown, the resistance values of the varistors are manipulated to change the levels of the input voltage signals by voltage division.

Figure 10:
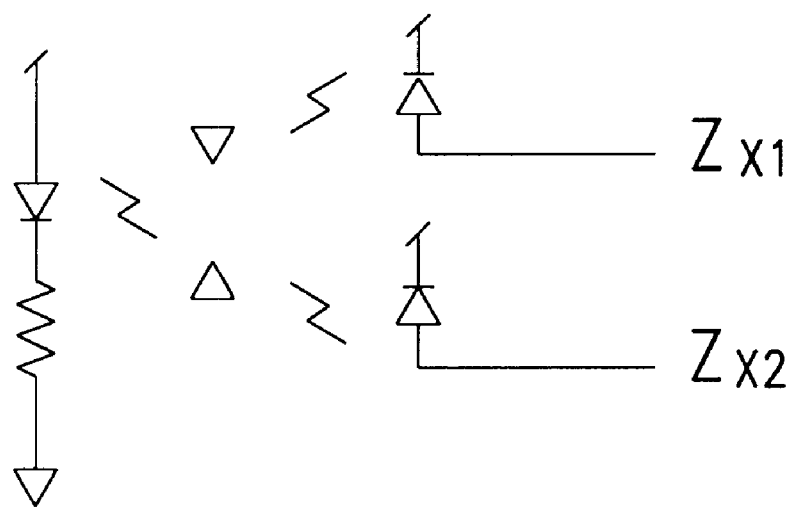
FIG. 10 is a schematic view corresponding to FIG. 8.

FIG. 10 is a circuit diagram showing photo-couplers in which input voltage signals of different levels are obtained by controlling transmission quantities of gratings, in order to control scrolling motions.

In other embodiment, a mouse comprises only two scroll input apparatus to generate signals of up and down, or that of left and right.

Figure 11:
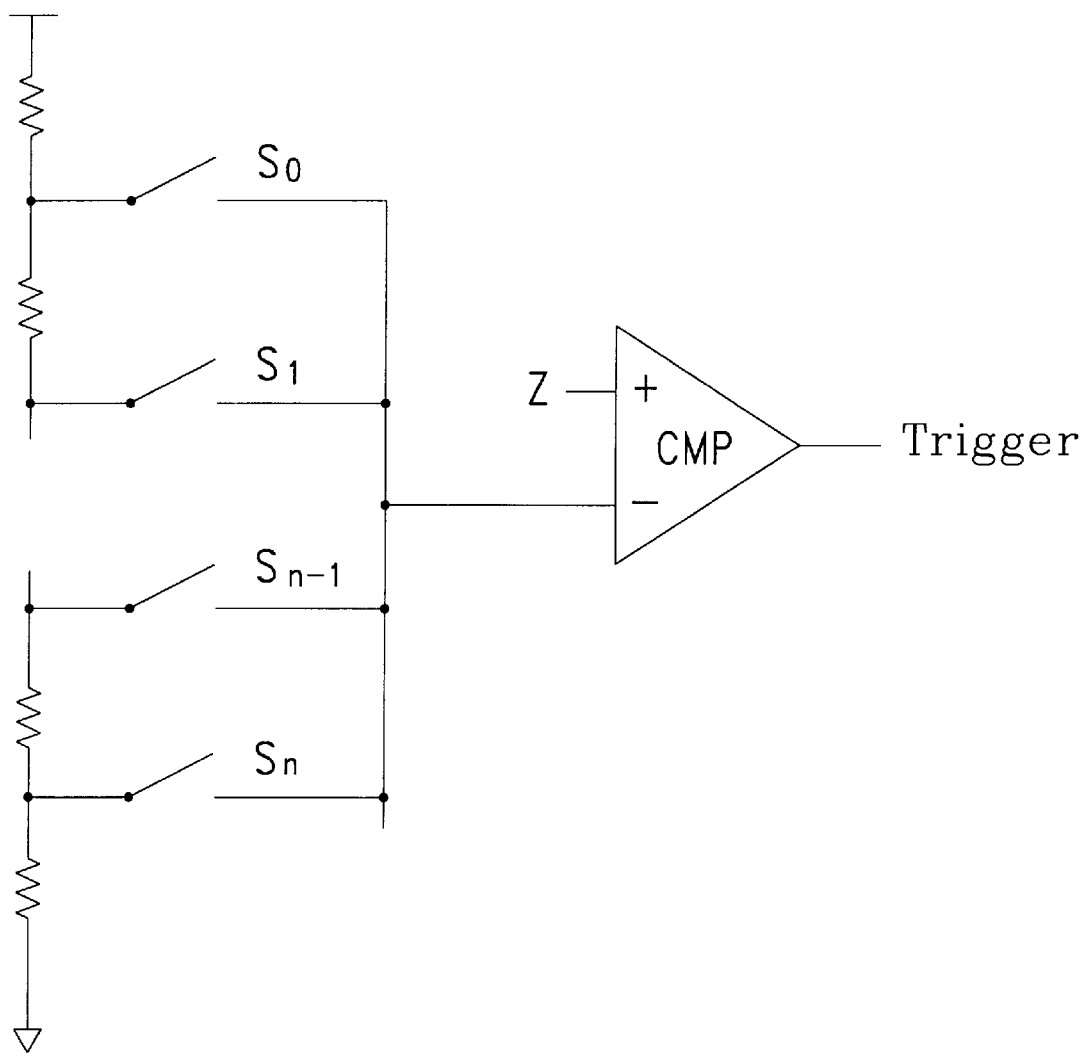
FIG. 11 is a circuit diagram of an analog-to-digital converter.
Figure 12:
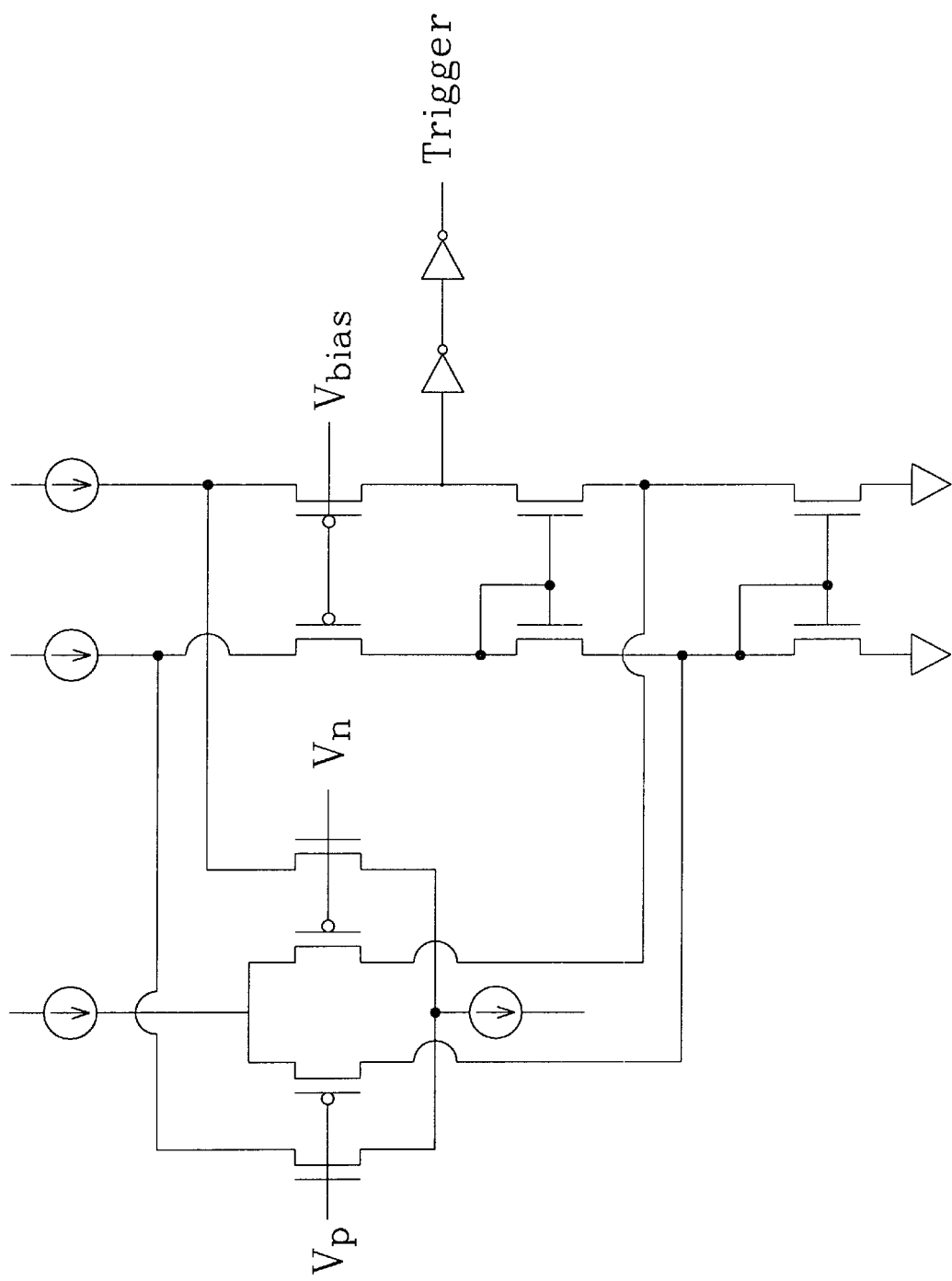
FIG. 12 is a circuit diagram of a comparator.

In the first two embodiment of the present invention, after the voltage signals are inputted, they are converted to digital signals by an analog-to-digital converter in the mouse, as shown in FIG. 11. Since the varistors or photo-couplers are used for voltage level input, to compensate for drift of power voltage $V_{DD}$, voltage division for serial resistors is used to generate a reference voltage for a comparator CMP in which the reference voltage is compared with input signal (Z). FIG. 12 shows a circuit example of the comparator CMP.

Figure 13:
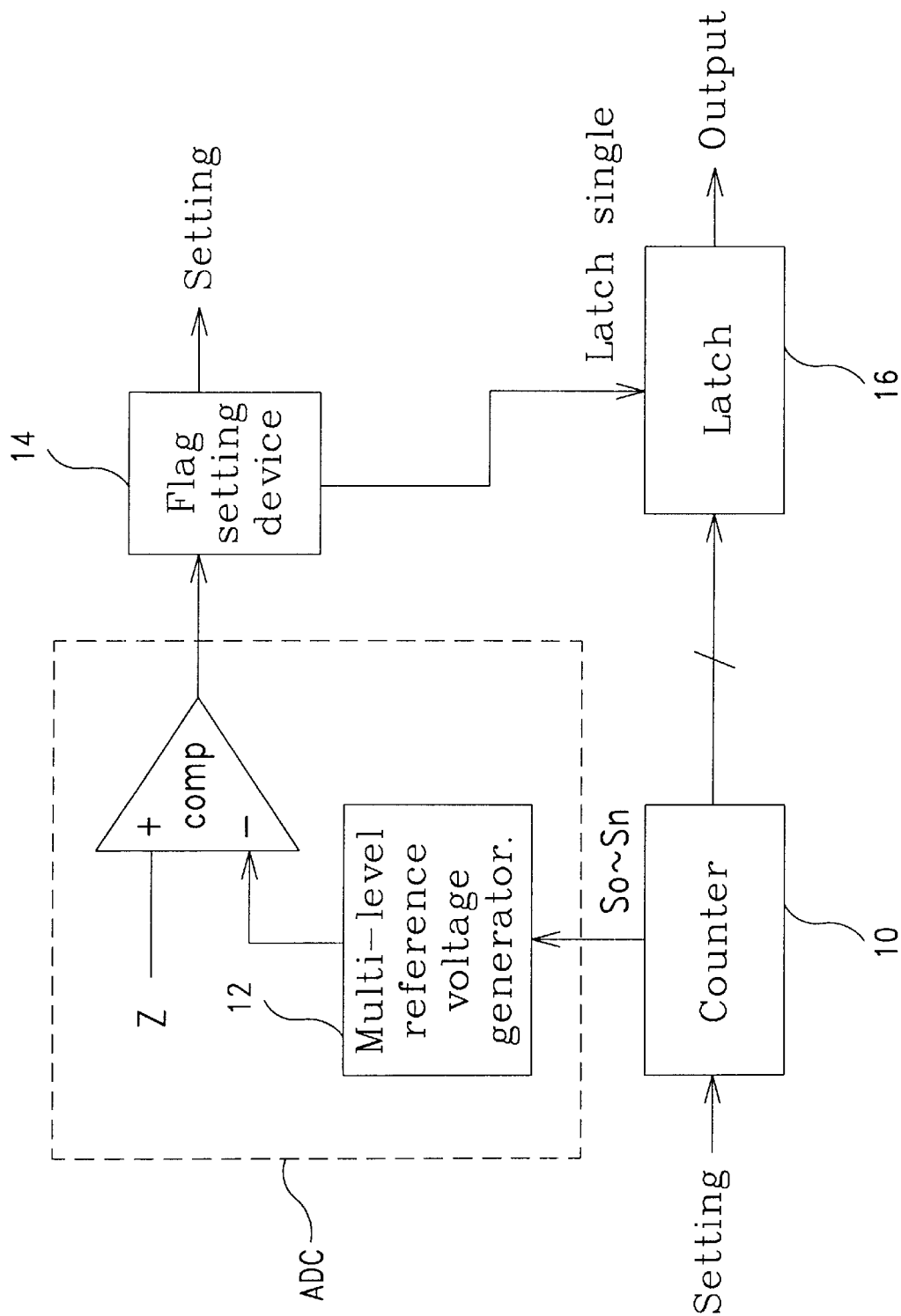
FIG. 13 is a circuit diagram of a latch of an analog-to-digital converter.

FIG. 13 explains a latch state of an analog-to-digital converter in which the circuit within the dotted block represents the circuit of the analog-to-digital converter in FIG. 11. Counter 10 makes an output from multi-level reference voltage generator 12 be the highest voltage. Then the counter 10 starts to count and decrements the output from the multi-level reference voltage generator 12 until comparator COMP is triggered. Therefore, a flag is set to be logic "1" by flag setting device 14, while a latch signal is sent out to latch the counter 10, which means that the value in latch 16 represents the status of input voltage signal (Z). The above-mentioned circuit is used for detecting voltage range.

Since the reference voltage from the multi-level reference voltage generator 12 to the comparator COMP is decremented, the comparator COMP is triggered first when the level of the input voltage signal (i) is higher. In other words, the apparatus responds quickly as the level of the input voltage signal (Z) is high.

While the present invention has been described in conjunction with preferred embodiments thereof, it is evident that many alternatives, modifications and variations will be apparent to those skilled in the art. For example, the resistance values of the serial resistors in the resistance detection unit can be changed on the basis of the magnitude of the leakage current. Accordingly, it is intended to embrace all such alternatives, modifications and variations that fall within the spirit and scope thereof as set forth in the appended claims.

What is claimed is:

1. A mouse scroll input apparatus for controlling scrolling motions in a computer window comprising: a signal input device for generating an input signal in response to an operation of a mouse user, wherein a scrolling speed of the window is determined solely by a level of the input signal.

2. The mouse scroll input apparatus according to claim 1, wherein the input signal is a voltage signal.

3. The mouse scroll input apparatus according to claim 2, wherein the signal input device comprises a varistor.

4. The mouse scroll input apparatus according to claim 2, wherein the signal input device comprises a photo-coupler.

5. The mouse scroll input apparatus according to claim 4, wherein the photo-coupler has a transmission quantity controlled by a grating to adjust the level of the voltage signal.

6. The mouse scroll input apparatus according to claim 1, wherein the signal input device comprises two portions corresponding to scrolling motions in upward and downward directions respectively, or leftward and rightward directions respectively.

7. The mouse scroll input apparatus according to claim 2, wherein the scrolling speed is increased with increase in the level of the voltage signal.

8. A mouse scroll input apparatus for controlling scrolling motions in a computer window comprising:
   a signal input device configured to generate an input signal that is in response to an operation of a mouse, the input signal having an instantaneous level value that is directly proportional to the operation of the mouse; and
   means for controlling a scrolling speed of the window, wherein the scrolling speed is instantaneously changed in proportion to the level value of the input signal.

* * * * *